United States Patent
Srebranig

(10) Patent No.: US 9,197,934 B2
(45) Date of Patent: Nov. 24, 2015

(54) FAULT TOLERANT SYSTEM WITH EQUIVALENCE PROCESSING DRIVING FAULT DETECTION AND BACKUP ACTIVATION

(75) Inventor: Steven Srebranig, Johnsburg, IL (US)

(73) Assignee: STMicroelectronics, Inc., Coppell, TX (US)

( * ) Notice: Subject to any disclaimer, the term of this patent is extended or adjusted under 35 U.S.C. 154(b) by 661 days.

(21) Appl. No.: 13/474,286

(22) Filed: May 17, 2012

(65) Prior Publication Data

US 2013/0312051 A1 Nov. 21, 2013

(51) Int. Cl.
*H04N 21/4425* (2011.01)
*H04N 21/426* (2011.01)
*H04N 21/61* (2011.01)
*H04H 40/90* (2008.01)
*H04H 20/12* (2008.01)
*G06F 11/18* (2006.01)

(52) U.S. Cl.
CPC ........... *H04N 21/4425* (2013.01); *H04H 20/12* (2013.01); *H04H 40/90* (2013.01); *H04N 21/42607* (2013.01); *H04N 21/6112* (2013.01); *H04N 21/6143* (2013.01); *G06F 11/184* (2013.01)

(58) Field of Classification Search
CPC ... G06F 11/182; G06F 11/188; G06F 11/184; H04H 20/12; H04H 40/90; H04N 21/4425
USPC .......................................................... 702/58
See application file for complete search history.

(56) References Cited

U.S. PATENT DOCUMENTS

| | | | |
|---|---|---|---|
| 6,208,296 B1 * | 3/2001 | Saib | 342/422 |
| 6,441,847 B1 | 8/2002 | Link et al. | |
| 7,840,832 B2 * | 11/2010 | Johansson et al. | 714/2 |
| 8,104,720 B2 * | 1/2012 | Hirvonen et al. | 244/194 |
| 2003/0067869 A1 * | 4/2003 | Harris et al. | 370/217 |
| 2003/0163829 A1 * | 8/2003 | Coufal et al. | 725/118 |
| 2004/0178801 A1 * | 9/2004 | Hart et al. | 324/637 |
| 2005/0066351 A1 * | 3/2005 | Robson | 725/13 |
| 2007/0195492 A1 * | 8/2007 | Tamminen et al. | 361/679 |
| 2008/0211918 A1 | 9/2008 | Balz | |
| 2009/0037772 A1 * | 2/2009 | Wegerich et al. | 714/26 |
| 2012/0213514 A1 * | 8/2012 | Yu | 398/43 |
| 2013/0024166 A1 * | 1/2013 | Herzog | 703/2 |

OTHER PUBLICATIONS

G. Latif-Shabgahi, History-based weighted average voter, 2001,IEEE,1066-6192/01, 402-408.*

(Continued)

*Primary Examiner* — John Breene
*Assistant Examiner* — Mohammad K Islam
(74) *Attorney, Agent, or Firm* — Gardere Wynne Sewell LLP

(57) ABSTRACT

A system includes a primary functionality and a backup functionality for the primary functionality. A measurement circuit measures operational parameter values of the primary functionality. A fault detection circuit determines a level of equivalence between the operation of the primary functionality and a reference functionality based on a weighted comparison of the measured operational parameter values of the primary functionality to corresponding reference operational parameter values for the reference functionality If the equivalence determination fails to find equivalence, the fault detection circuit signals a fault in the primary functionality and activates the backup functionality.

27 Claims, 2 Drawing Sheets

(56) References Cited

OTHER PUBLICATIONS

Texas Instruments, The effects of adjacent channel rejection, Nov. 2003, Texas Instruments, SPLY005, 1-17.*
Nasa, Software Fault Tolerance, Oct. 2000, Nasa, NASA/TM-2000-210616.*
Cisco, Cisco D9865, Satellite Receiver, Oct. 2010, 4035197 Trv C, 1-260.*
Viking, Redundant Parallel LNB Feed System, Viking, 2011, Nov. 1, 2011, 1-2.*
Ron J Patton, Fault Tollerant control system, The University of Hull, 1997, Hull HU6 &RX, 1033-1054.*
EP Search Report and Written Opinion for EP 13168197.5 dated Jun. 15, 2015 (7 pages).

* cited by examiner

FAULT TOLERANT SYSTEM WITH EQUIVALENCE PROCESSING DRIVING FAULT DETECTION AND BACKUP ACTIVATION

TECHNICAL FIELD

The present invention relates to systems implementing fault tolerance and, in particular, to a method and apparatus for monitoring system operation and activating alternate functionality in response to a detected fault.

BACKGROUND

It is common in complex systems, such as electric circuits, for certain critical functionalities to be supported by a backup or alternate functionality. In response to a detected fault in, failure of, or mal-performance by a primary functionality of the system, the provided backup or alternate functionality is activated. In this way, continued operation of the complex system is supported in spite of the primary functionality's fault, failure or mal-performance.

SUMMARY

The present invention is directed to a means for making the fault, failure or mal-performance detection. The operation of a primary functionality of a complex system is characterized by a set of parameters and, considering an ideal or nominal (or reference) representation of the primary functionality, an expected value for each of those parameters. The expected value is derived from an applicable distribution of possible (acceptable) values indicative of proper operation. Measured values of the parameters for the primary functionality are then obtained, and a mean equivalence level is calculated between the measured operation of the primary functionality and the ideal representation of the primary functionality. If the mean equivalence indicates that the primary functionality is not operating consistent with the ideal representation, a fault, failure or mal-performance detection is made. The complex system may then respond to that detection by replacing the primary functionality of the complex system with the backup or alternate functionality.

In an embodiment, a system comprises: a primary functionality; a backup functionality for said primary functionality; a measurement circuit configured to measure a plurality of operational parameter values of the primary functionality; and a fault detection circuit configured to determine a level of equivalence between the operation of the primary functionality and a reference functionality based on a weighted comparison of said measured plurality of operational parameter values of the primary functionality to a corresponding plurality of reference operational parameter values for the reference functionality, said fault detection circuit further configured to identify a fault in said primary functionality based on the equivalence determination and activate the backup functionality in response thereto.

In an embodiment, an apparatus comprises: a system under test; a measurement circuit configured to measure a plurality of values for operational parameters of a system under test, said operational parameters corresponding to a plurality of values for operational parameters of a reference system; and a control circuit configured to calculate an equivalence metric as a sum of relative percentages of the operational parameter values for the system under test versus the operational parameter values for the reference system and further control operation of the system under test in response to the calculated equivalence metric.

In an embodiment, a method comprises: measuring a plurality of operational parameter values of a primary functionality; determining a level of equivalence between the operation of the primary functionality and a reference functionality based on a weighted comparison of said measured plurality of operational parameter values of the primary functionality to a corresponding plurality of reference operational parameter values for the reference functionality; detecting a fault in said primary functionality based on the equivalence determination; and activating a backup functionality in response to the detected fault.

In an embodiment, a method for determining an equivalence level to a reference system defined by a plurality of values for operational parameters comprises: measuring a plurality of values for corresponding operational parameters of a system under test; calculating an equivalence metric as a sum of relative percentages of the operational parameter values for the system under test versus the operational parameter values for the reference system; and controlling operation of the system under test in response to the calculated equivalence metric.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
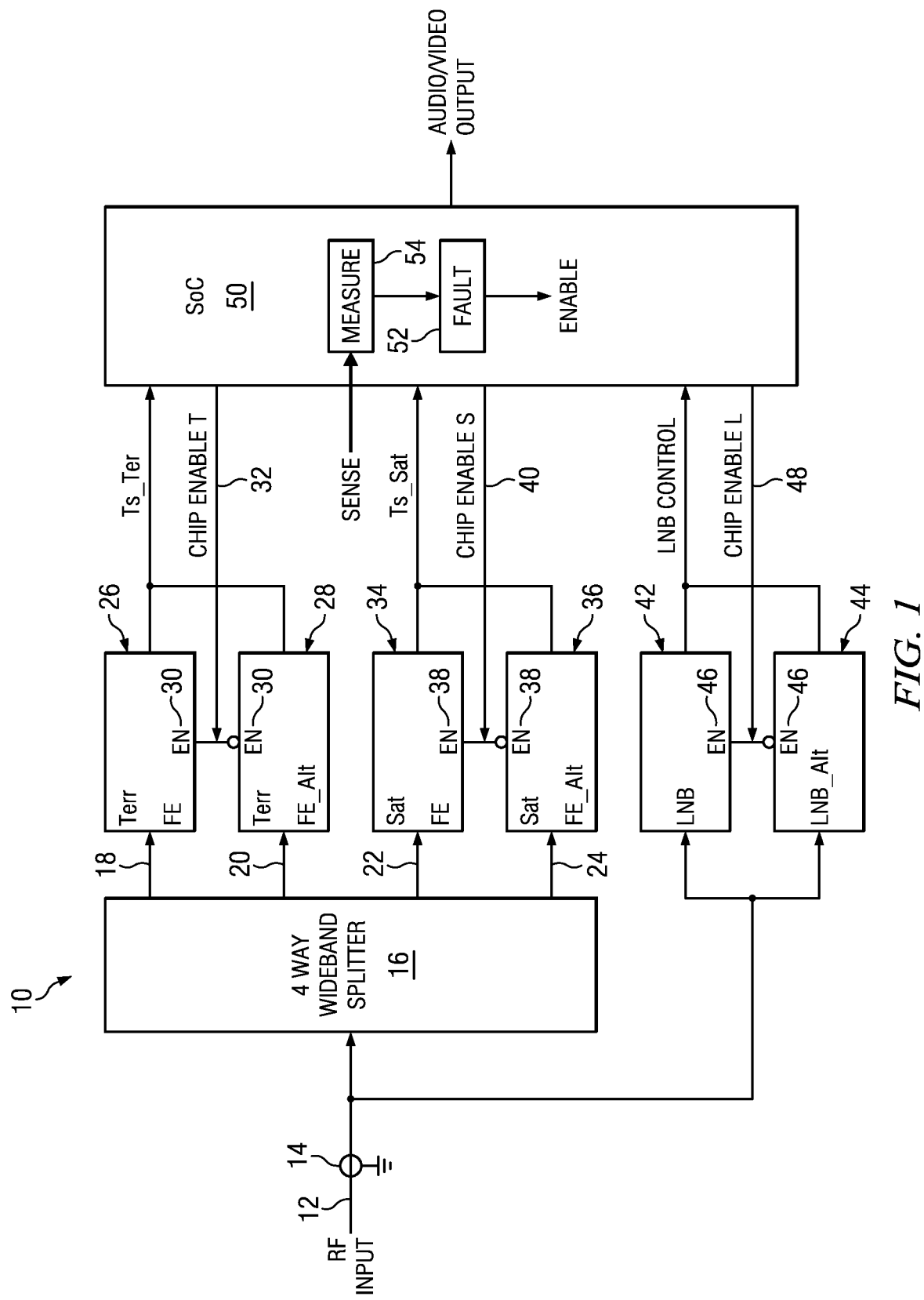
FIG. 1 is a block diagram of digital video signal receiver supporting fault tolerance through the provision of backup or alternate functionalities.

FIG. 1 shows a block diagram of digital video signal receiver 10 (commonly known in the art as a "set-top box") supporting fault tolerance through the provision of backup or alternate functionalities. The receiver 10 includes an input 12 that, for example, comprises a coaxial connection 14 for a free air antenna or satellite dish or combination thereof. The RF audio/video signal received through connection 14 is processed by a splitter 16 (for example, a four-way wideband splitter known in the art). The splitter 16 includes a plurality of outputs including two terrestrial signal outputs 18 and 20 and two satellite signal outputs 22 and 24.

The first terrestrial signal output 18 is connected to a first terrestrial front end receiver circuit 26. The second terrestrial signal output 20 is connected to a second terrestrial front end receiver circuit 28. The second terrestrial front end receiver circuit 28 may comprise a backup or alternate circuit for the first terrestrial front end receiver circuit 26. In other words, the first terrestrial front end receiver circuit 26 is the primary front end circuit functionality and the second terrestrial front end receiver circuit 28 is a secondary or redundant front end circuit functionality. The first and second terrestrial front end receiver circuits 26 and 28 each include an enable control input 30 fed by a terrestrial enable signal (Chip_Enable_T) 32. In the illustrated implementation, the first and second terrestrial front end receiver circuits 26 and 28 are enabled in a mutually exclusive manner. The enabled one of the first and second terrestrial front end receiver circuits 26 and 28 generates a received signal TS_Terr for further processing.

The first satellite signal output 22 is connected to a first satellite front end receiver circuit 34. The second satellite signal output 24 is connected to a second satellite front end receiver circuit 36. The second satellite front end receiver circuit 36 may comprise a backup or alternate circuit for the first satellite front end receiver circuit 34. In other words, the first satellite front end receiver circuit 34 is the primary front end circuit functionality and the second satellite front end receiver circuit 36 is a secondary or redundant front end circuit functionality. The first and second satellite front end receiver circuits 34 and 36 each include an enable control input 38 fed by a satellite enable signal (Chip_Enable_S) 40. In the illustrated implementation, the first and second satellite front end receiver circuits 34 and 36 are enabled in a mutually exclusive manner. The enabled one of the first and second satellite front end receiver circuits 34 and 36 generates a received signal TS_Sat for further processing.

Antenna control, such as that known in the art as smart-antenna or satellite multi-switch, is exemplified here with low-noise block (LNB) control. The digital video signal received through connection 14 is further received by a first LNB downconverter control circuit 42 and a second LNB downconverter control circuit 44. The second LNB downconverter control circuit 44 may comprise a backup or alternate circuit for the first LNB downconverter control circuit 42. In other words, the first LNB downconverter control circuit 42 the primary downconverter circuit and the second LNB downconverter control circuit 44 is a secondary or redundant downconverter circuit functionality. The first and second LNB downconverter control circuits 42 and 44 each include an enable control input 46 fed by a downconverter enable signal (Chip_Enable_L) 48. In the illustrated implementation, the first and second LNB downconverter control circuits 42 and 44 are enabled in a mutually exclusive manner with the SoC using an antenna bi-directional control protocol (e.g., DiSEqC 2.0) to identify the LNBs uniquely. The enabled one of the first and second LNB downconverter control circuits 42 and 44 generates a received signal LNB_Control for further processing.

The received TS_Terr signal, TS_Sat signal and LNB_Control signal are passed to a System on Chip (SoC) 50 which functions to process the signals and generate an audio/video output signal. The audio/video signal processing performed by the System on Chip (SoC) 50 is well known to those skilled in the art and will not be discussed in detail herein. Generally speaking, the System on Chip (SoC) 50 performs the standard signal processing functions with respect to the received TS_Terr signal and TS_Sat signal to generate the output audio/video signal.

The System on Chip (SoC) 50 further comprises a fault detection circuit (Fault) 52 which determines whether there is a fault in, failure of, or mal-performance by a primary functionality of the system 10, and in response to such a determination activate the provided backup or alternate functionality. The fault detection circuit 52 operates to process sensed values for operational parameters of the receiver 10, and in particular sensed values concerning operation of the first and second terrestrial front end receiver circuits 26 and 28, the first and second satellite front end receiver circuits 34 and 36 and the first and second LNB downconverter control circuits 42 and 44. The processing performed by the fault detection circuit 52 makes a fault, failure or mal-performance determination based on the sensed values for operational parameters and controls the generation of the terrestrial enable signal (Chip_Enable_T) 32, satellite enable signal (Chip_Enable_S) 40 and downconverter enable signal (Chip_Enable_L) 48 so as to selectively enable one of the first and second terrestrial front end receiver circuits 26 and 28, one of the first and second satellite front end receiver circuits 34 and 36 and one of the first and second LNB downconverter control circuits 42 and 44. For example, in the event the fault detection circuit 52 detects a failure of the first terrestrial front end receiver circuit 26 as indicated by processing of the sensed values for circuit 26 operational parameters, the logic state of the terrestrial enable signal (Chip_Enable_T) 32 is switched to enable operation of the second terrestrial front end receiver circuit 28.

The fault detection circuit 52 may comprise a microprocessor or microcontroller circuit within the SoC 50 that is configured, for example, through an appropriate programming, to process received operational parameter data as discussed herein and make a fault detection determination.

The System on Chip (SoC) 50 further includes measurement circuitry 54 which is configured to measure operational parameters of the first and second terrestrial front end receiver circuits 26 and 28, the first and second satellite front end receiver circuits 34 and 36 and the first and second LNB downconverter control circuits 42 and 44. Examples of operational parameters measured by the measurement circuitry 54 include Carrier to Noise ratio (C/N), Bit Error Rate (BER), Tuner frequency offset, Polarity Voltage level, DiSEqC delay, and the like. The measured values of the operational parameters are reported to the fault detection circuit 52 which, as described generally above, processes the values, makes a fault, failure or mal-performance determination, and controls generation of the enable signals to make a selection between primary and backup or alternate functionalities supported by the system 10.

The measurement circuit 54 may comprise any circuit configured to sense operation of the system 10 and its component parts and through such sensing make a measurement concerning performance with respect to desired operational parameters. Examples of the circuitry and functions of the measurement circuit 54 include Ts_Ter Error, Ts_Sat Error, Video Threshold of Visibility (ToV) error, maximum or minimum Automatic Gain Control (AGC), and the like.

Figure 2:
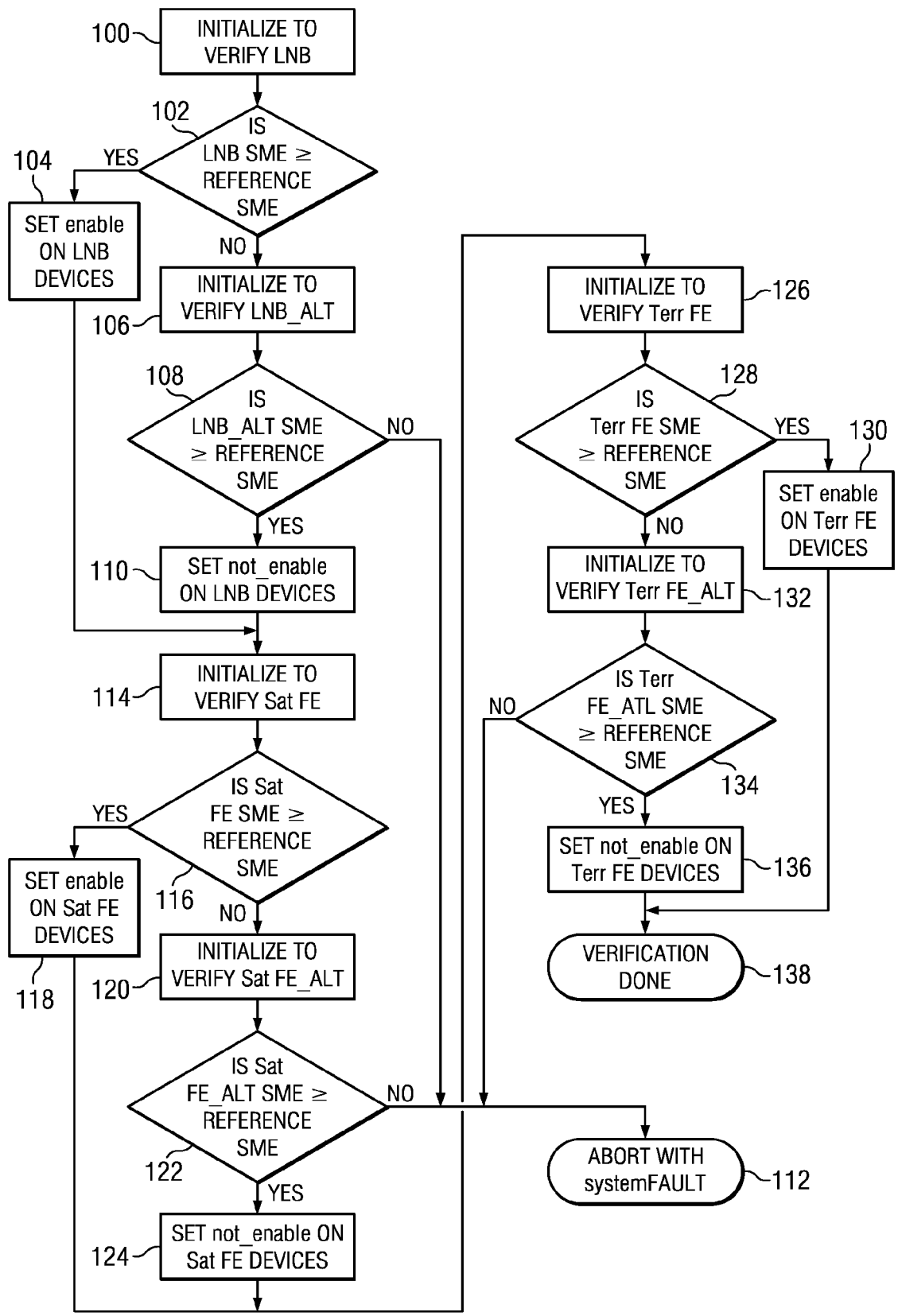
FIG. 2 is a flow diagram illustrating operation of a fault detection circuit for the receiver of FIG. 1.

Reference is now made to FIG. 2 which illustrates a flow diagram for operation of the fault detection circuit 52. This flow may, for example, represent the programming of the fault detection circuit 52 when implemented in the form of a microprocessor or microcontroller circuit within the SoC 50.

In step 100, initialization is made with respect to verifying the operation of primary functionality provided by the first LNB downconverter control circuit 42. This initialization includes using the measurement circuitry 54 to measure values for certain predefined operational parameters of the first LNB downconverter control circuit 42. Examples of measureable operational parameters for a LNB downconverter control circuit include DiSEqC delay, DiSEqC Transmission error, Polarity voltage level, and the like. A mean equivalence value (EqVal) is calculated from the measured operational parameter values in a weighted comparison with ideal or nominal or expected parameter values for the LNB downconverter control circuit (i.e., a reference circuit).

The calculated mean equivalence value (LNB SME=EqVal) is then compared in step 102 with a set mean equivalence (Reference SME) value for an idealized representation of the first LNB downconverter control circuit 42. If the mean equivalence value exceeds the reference SME value, the first LNB downconverter control circuit 42 is considered to be operating properly and the fault detection circuit 52 moves to step 104 and enables the first LNB downconverter control circuit 42, for example, by setting Chip_Enable_L to a first logic state.

If the mean equivalence value (LNB SME) does not exceed the reference SME value, the fault detection circuit 52 moves to step 106 and an initialization is made with respect to verifying the operation of the second LNB downconverter control circuit 44. This initialization includes measuring values for certain predefined operational parameters of the second LNB downconverter control circuit 44. Examples of measureable operational parameters for a LNB downconverter control circuit include DiSEqC delay, DiSEqC Transmission error, Polarity voltage level, and the like. A mean equivalence value (EqVal) is calculated from the measured operational parameter values in a weighted comparison with ideal or nominal or expected parameter values for the LNB downconverter control circuit (i.e., a reference circuit).

The calculated mean equivalence value (LNB_ALT SME=EqVal) is then compared in step 108 with a set mean equivalence (Reference SME) value for an idealized representation of the second LNB downconverter control circuit 44 (which may, for example, be identical to the idealized representation of the first LNB downconverter control circuit 42). If the calculated mean equivalence value exceeds the reference SME value, the second LNB downconverter control circuit 44 is considered to be operating properly and the fault detection circuit 52 moves to step 110 and enables the second LNB downconverter control circuit 44 (as a backup or alternate functionality to the first LNB downconverter control circuit 42), for example, by setting Chip_Enable_L to a second logic state. If the calculated mean equivalence value does not exceed the reference SME value, the fault detection circuit 52 moves to step 112 to issue a system fault notice.

From step 110 (or alternatively from step 112), the fault detection circuit 52 moves to step 114 where initialization is made with respect to verifying the operation of primary functionality provided by the first satellite front end receiver circuit 34. This initialization includes measuring values for certain predefined operational parameters of the first satellite front end receiver circuit 34. Examples of measureable operational parameters for a satellite front end receiver circuit include Insertion Loss (IL), Return Loss (RL), Adjacent Channel Interferance (ACI), Low RF Bit Error Rate (BER), High RF BER, and the like. A mean equivalence value (EqVal) is calculated from the measured operational parameter values in a weighted comparison with ideal or nominal or expected parameter values for the satellite front end receiver circuit (i.e., a reference circuit).

The calculated mean equivalence value (Sat FE SME=EqVal) is then compared in step 116 with a set mean equivalence (Reference SME) value for an idealized representation of the first satellite front end receiver circuit 34. If the calculated mean equivalence value exceeds the reference SME value, the first satellite front end receiver circuit 34 is considered to be operating properly and the fault detection circuit 52 moves to step 118 and enables the first satellite front end receiver circuit 34, for example, by setting Chip_Enable_S to a first logic state.

If the calculated mean equivalence value does not exceed the reference SME value, the fault detection circuit 52 moves to step 120 and an initialization is made with respect to verifying the operation of the second satellite front end receiver circuit 36. This initialization includes measuring values for certain predefined operational parameters of the second satellite front end receiver circuit 36. Examples of measureable operational parameters for a satellite front end receiver circuit include Insertion Loss (IL), Return Loss (RL), Adjacent Channel Interferance (ACI), Low RF Bit Error Rate (BER), High RF BER, and the like. A mean equivalence value (EqVal) is calculated from the measured operational parameter values in a weighted comparison with ideal or nominal or expected parameter values for the satellite front end receiver circuit (i.e., a reference circuit).

The calculated mean equivalence value (Sat FE_ALT SME=EqVal) is then compared in step 122 with a set mean equivalence (Reference SME) value for an idealized representation of the second satellite front end receiver circuit 36 (which may, for example, be identical to the idealized representation of the first satellite front end receiver circuit 34). If the calculated mean equivalence value exceeds the reference SME value, the second satellite front end receiver circuit 36 is considered to be operating properly and the fault detection circuit 52 moves to step 124 and enables the second satellite front end receiver circuit 36 (as a backup or alternate functionality to the first satellite front end receiver circuit 34), for example, by setting Chip_Enable_S to a second logic state. If the calculated mean equivalence value does not exceed the reference SME value, the fault detection circuit 52 moves to step 112 to issue a system fault notice.

From step 122 (or alternatively from step 112), the fault detection circuit 52 moves to step 126 where initialization is made with respect to verifying the operation of the first terrestrial front end receiver circuit 26. This initialization includes measuring values for certain predefined operational parameters of the first terrestrial front end receiver circuit 26. Examples of measureable operational parameters for a terrestrial front end receiver circuit include Insertion Loss (IL), Return Loss (RL), Adjacent Channel Interferance (ACI), Low RF Bit Error Rate (BER), High RF BER, and the like. A mean equivalence value (EqVal) is calculated from the measured operational parameter values in a weighted comparison with ideal or nominal or expected parameter values for the terrestrial front end receiver circuit (i.e., a reference circuit).

The calculated mean equivalence value (Terr FE SME=EqVal) is then compared in step 128 with a set mean equivalence (Reference SME) value for an idealized representation of the first terrestrial front end receiver circuit 26. If the calculated mean equivalence value exceeds the reference SME value, the first terrestrial front end receiver circuit 26 is considered to be operating properly and the fault detection circuit 52 moves to step 130 and enables the first terrestrial front end receiver circuit 26, for example, by setting Chip_Enable_T to a first logic state.

If the calculated mean equivalence value does not exceed the reference SME value, the fault detection circuit 52 moves to step 132 and an initialization is made with respect to verifying the operation of the second terrestrial front end receiver circuit 28. This initialization includes measuring values for certain predefined operational parameters of the second terrestrial front end receiver circuit 28. Examples of measureable operational parameters for a terrestrial front end receiver circuit include Insertion Loss (IL), Return Loss (RL), Adjacent Channel Interferance (ACI), Low RF Bit Error Rate (BER), High RF BER. A mean equivalence value (EqVal) is calculated from the measured operational parameter values in a weighted comparison with ideal or nominal or expected parameter values for the terrestrial front end receiver circuit (i.e., a reference circuit).

The calculated mean equivalence value (Terr FE_ALT SME=EqVal) is then compared in step 134 with a set mean equivalence (Reference SME) value for an idealized representation of the second terrestrial front end receiver circuit 28 (which may, for example, be identical to the idealized representation of the first terrestrial front end receiver circuit 26). If the calculated mean equivalence value exceeds the reference SME value, the second terrestrial front end receiver circuit 28 is considered to be operating properly and the fault detection circuit 52 moves to step 136 and enables the second terrestrial front end receiver circuit 28 (as a backup or alternate functionality to the first terrestrial front end receiver circuit 26), for example, by setting Chip_Enable_T to a second logic state. If the calculated mean equivalence value does not exceed the reference SME value, the fault detection circuit 52 moves to step 112 to issue a system fault notice.

After testing each of the functionalities as described above, the fault detection circuit 52 ends at step 138 with a completed verification and selective enabling of the primary and backup or alternate functionalities supported by the system 10.

The process of FIG. 2 may be performed at system configuration or initialization, such as at start-up. Alternatively, the process of FIG. 2 may be performed during system operation. The process of FIG. 2 may be performed one time for each system activation, or alternatively performed multiple times, including being performed periodically, if desired. The order of testing the various functionalities of the system 10 is exemplary only.

The operations performed in steps 100, 102, 16, 108, 114, 116, 120, 122, 126, 128, 132 and 134 comprise processes for identifying equivalence between systems. In particular, the processes determine equivalence between the system functionality and an idealized (or nominal) functionality based on a predetermined set of parameters, measured and expected values for those parameters, and a relative weighting of those parameters. The system functionality may then be identified as being negligibly dissimilar from the idealized (or nominal) functionality (and thus enabled for operation) or reasonably unlike the idealized (or nominal) functionality (and thus indicating the presence of a fault). In response to fault detection, the system functionality may be disabled from operation and, if supported by the system, replaced by a backup or alternate functionality.

The system 10 accordingly may perform, as a consistency/verification check using its driver software or embedded firmware in the form of the fault detection circuit 52, for example as part of an initialization/configuration process for the SoC 50, an equivalence test to verify that functionalities, devices and blocks within the system 10 are working as expected. The fault detection circuit 52 can also use this equivalence testing to enable fault tolerance on key system functionalities, devices and blocks; that is, if a functionality, device or block of the system seems to have failed in view of the equivalence testing, an available alternate functionality, device or block may be activated in its place. The program flow for such a system may be described in accordance with the following pseudo code (see, also FIG. 2):

```
0)      SoC system has N systems (System); each with 0 or more
alternates (AltSystem)
1)      Initialize system matrix (array of parameter set values and
weights as well as the respective reference value sets); identify the Set
Mean Equivalence (SME) value,
2)      For i=1;N;i++
        if !(EqVal of System(i) ≥ Mean Set Equivalence)
        {
                Set System(i) inactive)
                if AltSystem (i)
                        if !(EqVal of AltSystem(i) ≥ Mean Set
                        Equivalence)
                                return SoC failure
                        else set AltSystem(i) active
        }
        else set System(i) active
```

A description will now be provided as to the details of making the equivalence test.

A reference system functionality is identified by a basis set of parameters. The ideal (or nominal) representation of that reference system functionality has an expected value associated for each of these parameters. The expected value of any parameter is derived from the applicable distribution of possible values associated with correct (or permissible) operation of the reference functionality. Those skilled in the art will recognize that typical distributions used in this context include: a NORMAL distribution which is defined by Mean, Standard Deviation parameter values, a POISSON distribution which is defined by Mean parameter values, a TRIANGULAR distribution which is defined by Minimum, Mode, and Maximum parameter values, and a UNIFORM distribution which is defined by Minimum and Maximum parameter values. Other distributions known in the art could also be used with respect to a given parameter value.

Three sets are used for defining the reference system functionality and calculating equivalence.

A first set is referred to as the Parameter Set and is designated as follows:

Parameter Set: {Param1, Param2, . . . , ParamN}

The membership of the Parameter Set includes desired reference system functionality parameters (such as, for example, operational parameters).

A second set is referred to as the Normative Value Set and is designated as follows:

Normative Value Set: {ExpectedVal1, ExpectedVal2, . . . , ExpectedValN}

The membership of the Normative Value Set includes the expected value of the parameter identified in the Parameter Set. The expected value is a single value for the identified parameter. Preferably, the expected value is expressed by a distribution. As mentioned above, examples of distributions for use in the Normative Value Set include: a NORMAL distribution, a POISSON distribution, a TRIANGULAR distribution, and a UNIFORM distribution.

A third set is referred to as the Weighting Set and is designated as follows:

Weighting Set: {W1, W2, . . . , WN}

The membership of the Weighting Set includes a weight value assigned to each parameter identified in the Parameter Set. The weight value reflects the fraction that functionality parameter and its value contributes to the equivalence determination. Thus, a weight value of 4, for example, for Param1 in a Weighting Set: {4,1,1,4} indicates that the analysis of ExpectedVal1 contributes 40% (4/{4+1+1+4}) to the equivalence determination.

The last factor considered in making the equivalence determination is the Set Mean Equivalence value which is designated as follows:

Set Mean Equivalence>=P %

The value of P represents a percentage value which must be equaled or exceeded in order for equivalence between the system functionality under test and the reference system functionality to be found.

In accordance with the operations performed in steps 100, 102, 16, 108, 114, 116, 120, 122, 126, 128, 132 and 134 of FIG. 2, certain operational parameters for the functionalities of the system 10 are identified to define, for each such functionality, a Parameter Set: {Param1, Param2, . . . , ParamN}. Furthermore, with respect to an ideal or nominal operation of that system functionality (i.e., the reference functionality), an expected value is provided for each parameter to define the Normative Value Set: {ExpectedVal1, ExpectedVal2, . . . , ExpectedValN}. Also, a weight value is assigned to each parameter identified in the Parameter Set to define the Weighting Set: {W1, W2, ..., WN}. Lastly, a Set Mean Equivalence percentage P value is assigned.

To make the equivalence determination between an actual functionality of the system 10 that is under test and the reference functionality, the parameters are measured by the measurement circuitry 54 of the SoC 50 and a measured parameter set, referred to as the A Set, for the functionality under test is designated as follows:

A Set: {A1, A2, ..., AN} wherein the membership of the A Set is the measurement circuitry 54 measured value of the parameter identified in the Parameter Set. It will be understood that the measured value could comprise a single measured value, or a calculated distribution (for example, an average) with respect to a plurality of measured values over a give time period.

To determine the equivalence level between the actual functionality in system 10 defined by {A1, A2, ..., AN} under test and the reference functionality defined by {ExpectedVal1, ExpectedVal2, ..., ExpectedValN}, an equivalence metric in the form of an equivalent value (EqVal) is calculated as a sum of the relative percentages of the expected values divided by the number of values as follows:

$$EqVal = \frac{\sum_{i=1}^{N}[R(ExpectedVal_i, A_i) \cdot W_i]}{\sum_{i=1}^{N} W_i} \cdot 100 \qquad \text{Eq. (1)}$$

wherein:

$R(ExpectedVal_i, A_i) = \min\{ExpectedVal_i / A_i, A_i / ExpectedVal_i\}$

If the calculated EqVal meets or exceeds the Set Mean Equivalence percentage P value, then the actual functionality in system 10 is considered to have equivalence with the ideal or nominal operation of that system (reference) functionality. In other words, there is no instance of a fault, failure or mal-performance. In the context of the FIG. 2 implementation, the tests in steps 102, 108, 116, 122, 128 or 134 would be satisfied and the given functionality would be enabled for operation. Conversely, if the calculated EqVal does not meet or exceed the Set Mean Equivalence percentage P value, then the actual functionality in system 10 is considered to not have equivalence with the ideal or nominal operation of that system (reference) functionality. In other words, there is an instance of a fault, failure or mal-performance. In the context of the FIG. 2 implementation, the tests in steps 102, 108, 116, 122, 128 or 134 would be failed and the given functionality would be not be enabled for operation.

The foregoing may be better understood by reference to a specific example. Consider a system, like that of system 10 in FIG. 1, comprising a satellite receiver device. That device has been produced and passes certain measurable performance specifications for key functionalities. Those measurable performance specifications comprise Insertion Loss (IL), Return Loss (RL), ACI Performance (ACI), Low RF performance (LRF), and High RF performance (HRF). The Parameter Set is accordingly defined as:

Parameter Set: {IL, RL, ACI, LRF, HRF}

Measured historical data of the qualified (correctly operating) system in production indicates expected values (ExpectedVal) for the performance parameters as follows: Insertion Loss (IL)=0.25 dB; Return Loss (RL)=−13 dB, ACI Performance (ACI)=BER of 2.2e-9, Low RF performance (LRF)=BER of 2.1e-9, and High RF performance (HRF)= BER of 2.9e-9. Thus, the Normative Value Set for the qualified system as a reference functionality would be defined as:

Normative Value Set: {0.25 dB, −13 dB, BER of 2.2e-9, BER of 2.1e-9, BER of 2.9e-9}.

Weight values are assigned to each parameter identified in the Parameter Set to produce a Weighting Set defined as:

Weighting Set: {1, 4, 5, 10, 10}.

This particular weighting set indicates that a greater weight for correspondence between the measured values of the system under test to the expected values is being given to the Low RF performance (LRF) and High RF performance (HRF) than the other parameters.

In order for the actual functionality of a system 10 to have equivalence with the ideal or nominal operation of that system functionality a Set Mean Equivalence of greater than 90% is required. Thus, P>90%.

The measurement circuitry 54 of the SoC 50 is configured to make measurements on the Insertion Loss (IL), Return Loss (RL), ACI Performance (ACI), Low RF performance (LRF), and High RF performance (HRF) on the primary functionality of the system 10 (the functionality under test). A measured parameter set, referred to as the A Set, is thus obtained from measurement circuitry 54 parameter measurements as follows:

A Set: {0.23, −12.0, 2.9e-9, 2.3e-9, 3.1e-9}

The calculated equivalence metric EqVal (from Eq. 1) for the primary functionality would thus be:

EqVal=SUM{0.92*1/30, 0.92*4/30, 0.75*5/30, 0.91*10/30, 0.93*10/30}*100

EqVal={0.031+0.123+0.125+0.303+0.310}*100=0.892*100

EqVal=89.2%

Because the EqVal of 89.2% is less than the Set Mean Equivalence value of 90%, this would be indicative of detection of a fault in, failure of, or mal-performance by a tested functionality of the system 10. In response thereto, the fault detection circuit 52 would instead activate the backup or alternate functionality if available. If no backup or alternate functionality is available, then a system fault may be indicated.

In connection with activating the backup or alternate functionality, the measurement circuitry 54 of the SoC 50 would further be configured to make measurements on the Insertion Loss (IL), Return Loss (RL), ACI Performance (ACI), Low RF performance (LRF), and High RF performance (HRF) on the backup or alternate functionality of the system 10. A measured parameter set, referred to as the A Set, is thus obtained from measurement circuitry 54 parameter measurements as follows:

A Set: {0.24, −12.5, 2.9e-9, 2.2e-9, 3.0e-9}

The calculated equivalence metric EqVal (from Eq. 1) for the backup or alternate functionality would thus be:

EqVal=SUM{0.96*1/30, 0.96*4/30, 0.76*5/30, 0.95*10/30, 0.97*10/30}*100

EqVal={0.032+0.128+0.126+0.317+0.323}*100=0.926*100

EqVal=92.6%

Because the EqVal of 92.6% meets or exceeds the Set Mean Equivalence value of 90%, this would be indicative that the backup or alternate functionality of the system 10 is operating properly. This backup or alternate functionality may thus be enabled to replace the faulty tested functionality of the system 10.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
a primary functionality;
a backup functionality for said primary functionality;
a measurement circuit configured to measure values of a plurality of different operational parameters for different types of operational parameters of the primary functionality; and
a fault detection circuit configured to determine a level of equivalence between the operation of the primary functionality and a reference functionality based on a weighted comparison of said measured plurality of operational parameter values for the different types of operational parameters of the primary functionality to a corresponding plurality of reference operational parameter values for corresponding different types of operational parameters of the reference functionality, said fault detection circuit further configured to identify a fault in said primary functionality based on the equivalence determination and activate the backup functionality in response thereto.

2. The system of claim 1,
wherein the determined level of equivalence is calculated based on the following formula:

$$\frac{\sum_{i=1}^{N}[R(ExpectedVal_i, A_i) \cdot W_i]}{\sum_{i=1}^{N} W_i}$$

wherein ExpectedVal is the reference operational parameter value;
A is the measured operational parameter value;
W is the weight; and
$R(x,y) = \min \{x/y, y/x\}$.

3. The system of claim 2, wherein no fault is identified if EqVal meets or exceeds a threshold.

4. The system of claim 2, wherein a fault is identified if EqVal is less than a threshold.

5. The system of claim 1, wherein no fault is identified if operation of the primary functionality and the reference functionality are determined to be equivalent.

6. The system of claim 1, wherein a fault is identified if operation of the primary functionality and the reference functionality are determined not to be equivalent.

7. The system of claim 1, wherein said measurement circuit is further configured to measure the plurality of operational parameter values of the backup functionality; and wherein the fault detection circuit is further configured to determine a level of equivalence between the operation of the backup functionality and the reference functionality based on a weighted comparison of said measured plurality of operational parameter values of the backup functionality to the corresponding plurality of reference operational parameter values for the reference functionality, and wherein said fault detection circuit is further configured to identify a fault in said backup functionality based on the equivalence determination.

8. The system of claim 1, wherein the primary functionality is a front end circuit, and wherein the backup functionality is a backup front end circuit, said front end circuit having operational parameters selected from the group consisting of Insertion Loss, Return Loss, ACI Performance, Low RF performance, and High RF performance.

9. The method of claim 1, wherein determining the level of equivalence comprises calculating an equivalence value based on the following formula:

$$\frac{\sum_{i=1}^{N}[R(ExpectedVal_i, A_i) \cdot W_i]}{\sum_{i=1}^{N} W_i}$$

wherein ExpectedVal is the reference operational parameter value;
A is the measured operational parameter value;
W is the weight; and
$R(x,y) = \min \{x/y, y/x\}$.

10. The method of claim 9, wherein detecting the fault comprises identifying no fault if EqVal meets or exceeds a threshold.

11. The method of claim 9, wherein detecting the fault comprises identifying a fault if EqVal is less than a threshold.

12. A method, comprising:
measuring values of a plurality of different operational parameters for different types of operational parameters of a primary functionality;
determining a level of equivalence between the operation of the primary functionality and a reference functionality based on a weighted comparison of said measured plurality of operational parameter values for the different types of operational parameters of the primary functionality to a corresponding plurality of reference operational parameter values for corresponding different types of operational parameters for the reference functionality;
detecting a fault in said primary functionality based on the equivalence determination; and
activating a backup functionality in response to the detected fault.

13. The method of claim 12, wherein detecting the fault comprises determining whether the operation of the primary functionality is equivalent to operation of the reference functionality.

14. The method of claim 12, further comprising:
measuring values of a plurality of operational parameter values of the backup functionality;
determining a level of equivalence between the operation of the backup functionality and the reference functionality based on a weighted comparison of said measured plurality of operational parameter values of the backup functionality to a corresponding plurality of reference operational parameter values for the reference functionality;
detecting a fault in said backup functionality based on the equivalence determination.

15. The method of claim 12, wherein the primary functionality is a front end circuit, and wherein the backup functionality is a backup front end circuit, said front end circuit having operational parameters selected from the group consisting of Insertion Loss, Return Loss, ACI Performance, Low RF performance, and High RF performance.

16. A method for determining an equivalence level to a reference system defined by a plurality of values for different types of operational parameters, comprising:
- measuring a plurality of values for corresponding operational parameters for different types of operational parameters of a system under test;
- calculating an equivalence metric as a sum of relative percentages of the operational parameter values for the different types of operational parameters for the system under test versus the different types of operational parameter values for the reference system; and
- controlling operation of the system under test in response to the calculated equivalence metric.

17. The method of claim 16, wherein controlling comprises switching to a backup system if the calculated equivalence metric indicates a failure of the system under test.

18. The method of claim 16, wherein the equivalence metric is calculated in accordance with the following formula:

$$\frac{\sum_{i=1}^{N}[R(ExpectedVal_i, A_i) \cdot W_i]}{\sum_{i=1}^{N} W_i}$$

wherein ExpectedVal is the operational parameter value for the reference system;
A is the measured operational parameter value for the system under test;
W is a weight; and
$R(x,y) = \min\{x/y, y/x\}$.

19. The method of claim 16, wherein the sum of relative percentages is a weighted sum of relative percentages.

20. The method of claim 16, further comprising comparing the calculated equivalence metric against a threshold, and wherein controlling comprises enabling operation of the system under test if the calculated equivalence metric meets or exceeds the threshold.

21. The method of claim 20, wherein controlling comprises disabling operation of the system under test and enabling a backup system if the calculated equivalence metric is less than the threshold.

22. Apparatus, comprising:
- a system under test;
- a measurement circuit configured to measure a plurality of values for operational parameters for different types of operational parameters of a system under test, said operational parameters corresponding to a plurality of values for operational parameters for different types of operational parameters of a reference system; and
- a control circuit configured to calculate an equivalence metric as a sum of relative percentages of the operational parameter values for the different types of operational parameters for the system under test versus the operational parameter values for the different types of operational parameters for the reference system and further control operation of the system under test in response to the calculated equivalence metric.

23. The apparatus of claim 22, further comprising a backup system selectable to replace the system under test, said control circuit configured to switch to the backup system if the calculated equivalence metric indicates a failure of the system under test.

24. The apparatus of claim 22, wherein the equivalence metric is calculated in accordance with the following formula:

$$\frac{\sum_{i=1}^{N}[R(ExpectedVal_i, A_i) \cdot W_i]}{\sum_{i=1}^{N} W_i}$$

wherein ExpectedVal is the operational parameter value for the reference system;
A is the measured operational parameter value for the system under test;
W is a weight; and
$R(x,y) = \min\{x/y, y/x\}$.

25. The apparatus of claim 22, wherein the sum of relative percentages is a weighted sum of relative percentages.

26. The apparatus of claim 22, wherein the control circuit is further configured to compare the calculated equivalence metric against a threshold, and wherein controlling operation comprises enabling operation of the system under test if the calculated equivalence metric meets or exceeds the threshold.

27. The apparatus of claim 26, wherein controlling comprises disabling operation of the system under test and enabling a backup system if the calculated equivalence metric is less than the threshold.

* * * * *